July 24, 1934. J. BETHENOD 1,967,857
ELECTRIC POWER TRANSLATING SYSTEM
Filed Nov. 21, 1933
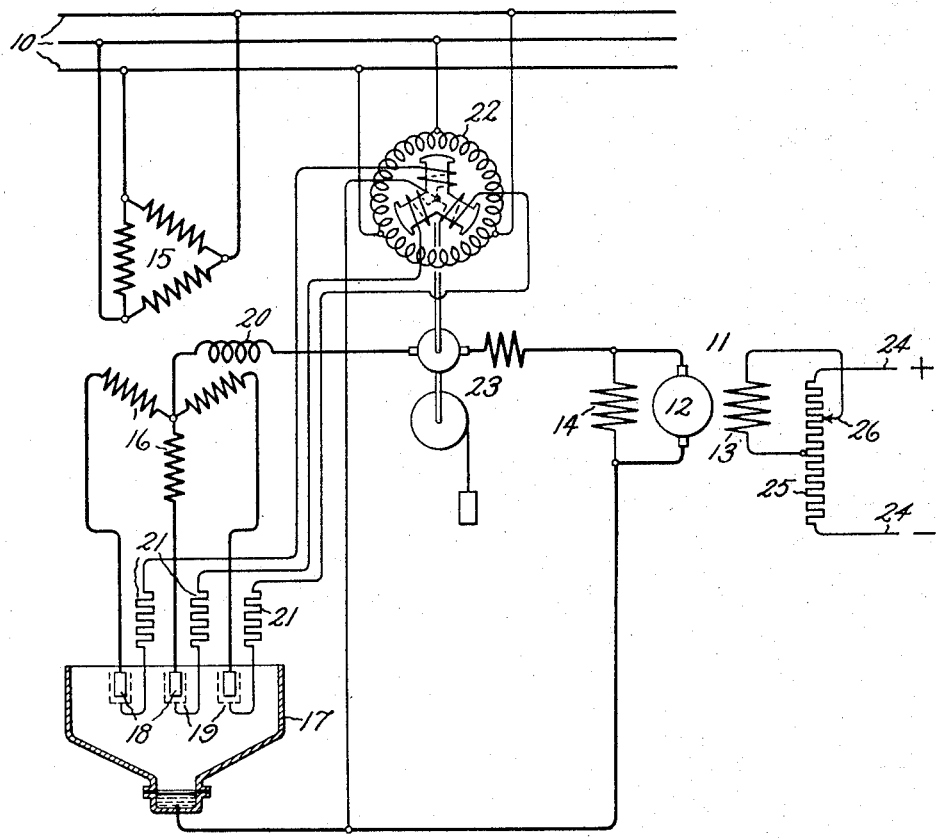
Inventor:
Joseph Bethenod,
by Harry E. Dunham
His Attorney.

Patented July 24, 1934

1,967,857

UNITED STATES PATENT OFFICE 1,967,857

ELECTRIC POWER TRANSLATING SYSTEM

Joseph Bethenod, Paris, France, assignor to General Electric Company, a corporation of New York Application November 21, 1933, Serial No. 699,027
In France December 29, 1932

7 Claims. (Cl. 172—274)

My invention relates to electric power translating systems and more particularly to such systems for translating energy from an alternating current supply circuit to an electric motor by means of which the motor may be operated to regenerate under predetermined conditions.

Heretofore there have been devised numerous systems including electric valves for operating an electric motor from an alternating current supply circuit. It is well known that both the magnitude and the polarity of the voltage impressed upon the motor by such a system may be readily controlled by controlling the conductivities of the electric valves. However, the direction of current flow in such a system cannot be reversed because of the unilateral conductivity characteristics of the valves. In the arrangements of the prior art, therefore, when it has been desired to operate the motor regenerating, that is, transmitting energy back to the supply circuit, it has been necessary either to supply an additional group of electric valves oppositely connected to the main electric valves to transmit energy in the reverse direction or to provide means for reversing the polarity of the connections to the motor, thus reversing its counter-electromotive force, that is, its generator voltage, and enabling it to supply current in the same direction. The first of these arrangements involves considerable additional apparatus and is thus costly and, in many installations, economically unjustifiable. The second of these arrangements, on the other hand, involves the switching of currents of considerable magnitude under certain conditions and also produces certain discontinuities in the operation of the system and strains upon the motor and connected apparatus.

It is an object of my invention, therefore, to provide an improved electric power translating system including an electric valve or valves for transmitting energy from an alternating current supply circuit to an electric motor by means of which the motor may be operated regenerating, which will overcome the above mentioned disadvantages of the arrangements of the prior art and which will be simple, economical and reliable in operation.

It is another object of my invention to provide an improved electric power translating circuit including an electric valve, or valves, for transmitting energy from an alternating current circuit to an electric motor in which the electric motor may be operated regenerating without the aid of additional electric valves for transmitting current in the opposite direction.

It is a further object of my invention to provide an improved electric power translating system including an electric valve or valves for operating a motor from an alternating current supply circuit, by means of which the motor may be operated regenerating and in which there are no discontinuities or interruptions in the motor torque or other operating conditions of the system.

It is a further object of my invention to provide an improved electric power translating system including an electric valve or valves for operating an electric motor from an alternating current supply circuit by means of which the motor may be operated regenerating and by means of which the load current of the system may be maintained substantially constant under both motoring and regenerating operations.

In accordance with one embodiment of my invention, an electric motor is connected to be energized from an alternating current supply circuit through a group of electric valves connected to rectify and control the current supplied to the armature winding. In order to reverse the counter electromotive force of the motor, its field winding may be supplied from any suitable source of direct current through an arrangement for gradually and uniformly reversing the direction of the field current, as for example, a potentiometer connected across the source of field current. In case the load connected to the motor tends to overhaul, increasing the speed of the motor, the polarity of its counter-electromotive force is reversed by reversing the field current so that the motor now tends to maintain the flow of current through the rectifying valves in the same direction as when energy is supplied from the alternating current circuit. Alternating potentials are impressed upon the control electrodes, or grids, of the electric valves, and, when the field current is reversed, the phase relation of these alternating potentials is changed so that the power component of the current transmitted between the alternating current circuit and the motor through the electric valves is reversed in phase with respect to the potential of the supply circuit; that is, energy flows in an opposite direction, the electric valves operating as inverters to transmit energy from the armature winding of the motor to the alternating current circuit. In the preferred embodiment of my invention this shift in phase of the control potentials of the electric valves is effected by means responsive to the armature current of the motor operating directly on a phase shifting mechanism controlling the potentials of the electric valves to maintain substantially constant the load current flowing in the system. With such an arrangement, the transition from motoring to regenerating is accomplished smoothly and uniformly without any discontinuities in the torque of the motor. Such an arrangement may also be utilized for reversing the direction of rotation of the motor, the motor regenerating during the period in which it is slowing down to rest, and then starting up as a motor in the opposite direction.

For a better understanding of my invention, together with other and further objects thereof, reference is had to the following description, taken in connection with the accompanying drawing, and its scope will be pointed out in the appended claims. The single figure of the drawing diagrammatically illustrates my invention as applied to a system for transmitting energy from a three phase alternating current supply circuit to a direct current motor.

Referring now more particularly to the drawing, there is shown a system embodying my invention for transmitting energy from a three phase alternating current supply circuit 10 to a direct current motor 11 provided with an armature winding 12 and a field winding 13. In certain cases, also, it may be desirable to add an auxiliary self-exciting field winding 14 to improve the stability of the system. The armature winding 12 is connected to be energized from the supply circuit 10 through a suitable rectifying apparatus comprising a supply transformer having a three phase primary winding 15 connected to the supply circuit and a star connected three phase secondary winding 16 connected to the armature 12 through a plurality of valves or valve paths, such as a multiple anode, single cathode, mercury vapor discharge device 17. The device 17 is illustrated as comprising a plurality of anodes 18 and associated control electrodes or grids 19 and a single cathode, although it will be apparent to those skilled in the art that any suitable type of electric valve may be employed, either multiple anode, single cathode, as illustrated, or a plurality of single anode, single cathode, electric valves. A smoothing reactor 20 is preferably included in the unidirectional current circuit connected to the armature winding 12.

The control electrodes 19 of the discharge device 17 are arranged to have their excitation varied in accordance with the load current of the system. This may be accomplished in any suitable manner, and by way of example I have shown the control electrodes 19 connected to be energized from the supply circuit 10 through current limiting resistors 21 and a rotary phase shifting transformer 22. The position of the secondary member of the rotary phase shifting transformer 22 is controlled, to control the phase relation of the potentials impressed upon the control electrodes 19, by means of a torque motor 23 connected in series with the armature winding 12. The field winding 13 of the motor 11 may be energized from any suitable source of unidirectional current 24 and, in case it is desired to regenerate without reversing the direction of rotation of the motor, a potentiometer 25 provided with an adjustable connection 26 is interposed between the direct current circuit 24 and field winding 13 to enable the field currents of the motor 11 to be reversed as desired.

The manner in which the rectifying apparatus comprising the transformer 15—16 and the vapor electric discharge device 17 operates to supply unidirectional current to the motor 11 under normal motoring conditions will be well understood by those skilled in the art and need not be explained in detail. The torque of motor 23 is effective to vary the position of the secondary member of the rotary phase shifting transformer 22 to vary the phase of the alternating potentials impressed upon the grids 19 to vary the average unidirectional potential impressed upon the armature winding 12 to maintain the armature current substantially constant. In case the load connected to the motor 11 tends to overhaul, driving it at such a speed that its counter-electromotive force exceeds the voltage supplied by the rectifier, the unidirectional current flowing in the system will be reduced to zero and will tend to reverse, but, because of the unilateral conductivity characteristics of the discharge device 17, such a reversal of the current is impossible. Under these conditions, if it is desired to regenerate, and thus limit the speed of the motor 11 and its connected load, the adjustable connection 26 of the potentiometer 25 is moved to gradually and uniformly reverse the field current, and thus reverse the polarity of the counter-electromotive force of the armature winding 12. The result of such a reversal of the field current of the motor 12 alone would be that the counter-electromotive force of the motor 11 would be in the same direction as the applied voltage of the rectifier and a destructive power current would be supplied from the rectifier to the motor 11 which would quickly reverse the motor but which would produce no regeneration. However, as the initial field current is gradually reduced and uniformly increased to a similar value of an opposite polarity and the counter-electromotive force of the motor 11 is similarly reversed, an excessive current is prevented by means of the torque motor 23 and phase-shifting transformer 22 which are effective to maintain the current substantially constant in magnitude. The torque motor 23 acts to retard the potentials impressed upon the grids 19 simultaneously with the decreasing of the field current by the movement of the adjustable connection 26, to keep the average voltage of the rectifier substantially equal to the counter-electromotive force of the motor 11. These two quantities decrease together, the supply voltage exceeding the counter-electromotive force of the motor 11 by a value only sufficient to maintain the armature current for which the torque motor 23 is adjusted. Similarly, as the field current of the winding 13 passes through zero and is gradually increased in an opposite direction, the potentials applied to the grids 19 of the discharge device 17 are progressively retarded until the average voltage supplied by the rectifier is negative; that is, until current flows through the discharge device 17 of the rectifier in such a way that its power component is in phase opposition to the voltage of the supply circuit 10. In other words, the energy is provided by the armature winding 12 of the motor 11 which is operating regenerating to return energy to the supply circuit 10. As under motoring conditions, the torque motor 23 is effective to maintain constant the regenerating current so that the transition from motoring to regenerating is gradual and uniform without any discontinuities in torque of the motor 11. Obviously, in case the load connected to the motor 11 ceases to overhaul, the reverse operation will take place.

In case it is desired to operate the motor 11 as a reversing motor and to brake the motor during the reversing operation by regenerating, the operation will be substantially similar to that described above. By gradually and uniformly reversing the direction of the field current, the motor 11 will regenerate during its entire braking operation until it comes to rest and will then start as a motor rotating in the opposite direction. Again, in case the motor 11 is connected to a load in which the motor operation and regenerating operation correspond to different directions of rotation, of which a hoisting apparatus is a well known example, the apparatus for reversing the field current for the motor 11 may be omitted. Under such conditions, the motor 11 will operate as a motor in raising the hoist, while in lowering the hoist its direction of rotation, and hence its counter-electromotive force, will be reversed to regenerate without reversing the field current of the motor.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to obtain by Letters Patent of the United States, is:

1. An electric power translating system for operating a regenerative motor from an alternating current supply circuit comprising a motor provided with field and armature windings, an electric valve for permanently interconnecting said supply circuit and said armature winding to transmit energy therebetween, means for supplying current to said field winding, and means for reversing the direction of energy flow between said supply circuit and said motor comprising means for reversing the polarity of the counter-electromotive force of the motor and means responsive to the variation in the armature current of said motor occasioned by the reversal of its counter-electromotive force for controlling the conductivity of said valve to reverse the phase of the power component of the current transmitted thereby with respect to the potential of said supply circuit.

2. An electric power translating system for operating a regenerative motor from an alternating current supply circuit comprising a motor provided with field and armature windings, an electric valve for permanently interconnecting said supply circuit and said armature winding to transmit energy therebetween, means for supplying current to said field winding, and means for reversing the direction of energy flow between said supply circuit and said motor comprising means for reversing the current supplied to said field winding and means responsive to the variation in the armature current of said motor occasioned by the reversal of its field for controlling the conductivity of said valve to reverse the phase of the power component of the current transmitted thereby with respect to the potential of said supply circuit.

3. An electric power translating system for operating a regenerative motor from an alternating current supply circuit comprising a motor provided with field and armature windings, an electric valve for permanently interconnecting said supply circuit and said armature winding to transmit energy therebetween, said valve being provided with a control electrode, means for supplying unidirectional current to said field winding, and means for reversing the direction of energy flow between said supply circuit and said motor comprising means for reversing the current supplied to said field winding, means for impressing an alternating potential upon the control electrode of said valve, and means responsive to the load current of the system for varying the phase of said alternating potential.

4. An electric power translating system for operating a regenerative motor from an alternating current supply circuit comprising a motor provided with field and armature windings, rectifier means including a plurality of electric valves for permanently interconnecting said supply circuit and said armature winding to transmit energy therebetween, said valves being provided with control electrodes, means for supplying unidirectional current to said field winding, and means for reversing the direction of energy flow between said supply circuit and said motor comprising means for reversing the current supplied to said field winding, means for impressing upon the control electrodes of said valves alternating potentials derived from said supply circuit, and means responsive to the armature current of said motor for varying the phase of said alternating potentials.

5. An electric power translating system for operating a regenerative motor from an alternating current supply circuit comprising a motor provided with field and armature windings, rectifier means including a plurality of electric valves for permanently interconnecting said supply circuit and said armature winding to transmit energy therebetween, said valves being provided with control electrodes, means for supplying unidirectional current to said field windings, and means for reversing the direction of energy flow between said supply circuit and said motor comprising means for reversing the current supplied to said field winding, a rotary phase shifting transformer energized from said source and provided with a secondary winding connected to excite the control electrodes of said valves, and a torque motor connected in circuit with said armature winding and arranged to drive the secondary winding of said phase shifting transformer.

6. An electric power translating system for operating a regenerative motor from an alternating current supply circuit comprising a motor provided with field and armature windings, rectifier means including a plurality of electric valves for permanently interconnecting said supply circuit and said armature winding to transmit energy therebetween, said valves being provided with control electrodes, a source of unidirectional current for energizing said field winding, and means for reversing the direction of energy flow between said supply circuit and said motor comprising a potentiometer interposed between said source of unidirectional current and said field winding for reversing the field current, means for impressing upon the control electrodes of said valves alternating potentials derived from said supply circuit, and means responsive to the armature current of said motor for varying the phase of said alternating potentials.

7. In combination, a source of alternating current, an electric motor provided with field and armature windings, an electric valve permanently interconnecting said source and the armature winding of said motor to transmit energy therebetween, a source of direct current for energizing said field winding, and means for reversing the direction of energy flow between said supply circuit and said motor comprising means for reversing the polarity of the counter-electromotive force of said motor, and means responsive to the variation in the armature current of said motor occasioned by the reversal of its counter-electromotive force for controlling the conductivity of said valve to reverse the phase of the power component of the current transmitted thereby with respect to the potential of said supply circuit.

JOSEPH BETHENOD.